United States Patent Office 3,360,449
Patented Dec. 26, 1967

3,360,449
ACTINIC LIGHT ACTIVATED CATALYTIC DEHYDROGENATION OF UNSATURATED HYDROCARBONS
Arnold N. Wennerberg, Chicago, Ill., assignor to Standard Oil Company, Chicago, Ill., a corporation of Indiana
No Drawing. Filed Aug. 14, 1964, Ser. No. 389,793
12 Claims. (Cl. 204—162)

This invention relates to the activation of certain dehydrogenation catalysts. More particularly, it relates to the activation of dehydrogenation catalysts which consist of oxides of three different classes of metals, low melting metals of periodic Group II–B having an atomic weight from about 65 to about 113, e.g., zinc or cadmium, an alkaline earth metal, for example, calcium, magnesium or barium and aluminum wherein the catalyst is subjected to ultraviolet irradiation.

In patent application of S.N. 303,676, filed Aug. 21, 1963, now Patent No. 3,278,453, it has been disclosed that the above named solid catalyst is effective in dehydrogenating unsaturated hydrocarbons. Despite its many advantages that catalyst system requires high operating temperatures to effect satisfactory conversions. This results in an expenditure of a great deal of thermal energy and a reduction of catalyst life. It has been known that ultraviolet irradiation increases the activity of certain zinc oxide based catalysts, but it has not been known that the ultraviolet activation increases the rate of the dehydrogenation of olefins and other unsaturated hydrocarbons. The irradiation of the above disclosed catalyst produces results which could not have been predicted.

It has been discovered that when a catalyst consisting of a combination of alumina and zinc oxide or cadmium oxide, and calcium oxide, barium oxide or magnesium oxide is irradiated with ultraviolet light at 600 to 7000 Angstrom units (A.) the resulting catalyst has a much greater activity. The rate of conversion with irradiated catalyst can go up to four times that obtained with the unirradiated catalyst. It is immaterial whether the radiation source is ultraviolet light or light emitted from an active radiation source. The radiation source can produce active irradiation or ultraviolet light as long as the radiation stays in the 600 to 7000 Angstrom (A.) range.

The ultraviolet irradiated catalyst is useful for dehydrogenating unsaturated hydrocarbons to more useful unsaturated compounds. This catalyst is effective in converting mono olefins to conjugated dienes and dehydrogenating alkyl hydrocarbon substituted aromatic hydrocarbons having two or more carbon atoms in the alkyl hydrocarbon substituent to vinyl aromatics. This catalyst is also useful in the dehydrogenating of certain hydrocarbons having a certain mono olefin open chain of 4–6 chain carbon atoms in length and a total of 6 to 20 carbon atoms, e.g. benzene can be obtained from n-hexene by this process.

In dehydrogenating 2-methyl-butene-2 to isoprene, using the irradiated catalyst, the conversion rate was 2:1 at 450° C., 3:1 at 515° C. and 4:1 at 600° C. over the unirradiated thermally activated catalyst. This means that at 450° the rate of conversion of the irradiated catalyst is twice as great as that of the unirradiated thermally activated catalyst at 600° C. Because of this higher conversion rate, the dehydrogenations can be run at lower temperatures, thus making the endothermic reaction less heat consuming. It has also been observed that longer catalyst life and improved selectivity is obtained when the irradiated catalyst is used in the dehydrogenation process. This is understandable since lower reaction temperatures can be effectively utilized. It is well known in the art that there is less coke formation when lower reaction temperatures can be employed. Despite the lower operating temperature the irradiated catalyst retains all the advantages of the thermally activated catalyst, thus mono olefin dehydrogenation to dienes is accomplished without skeletal rearrangement of the olefin and thus avoiding the complex separation problems which make many dehydrogenation processes commercially unattractive. Likewise the high liquid space velocities of the thermally activated catalyst are retained. Thus feed rates of up to 10 volumes of feed per volume of catalyst can be operated effectively. This high feed rate can be obtained with $\frac{1}{16}$ and $\frac{1}{8}$ inch and longer catalyst pellets, with 8 x 12 or 14 x 30 mesh catalyst beads or with 30/60 or finer catalyst mesh powder. The catalyst can tolerate high rates of feed, but it functions effectively also at low feed rates. Suitable operating conditions can be achieved where the feed stock is introduced to provide a liquid hourly space velocity in the range from about 0.5 to 10.0 volumes of feed per volume of catalyst. The desirable range is 1 to 8 and the preferable range is about 1 to 5.

A novel dehydrogenation catalyst is produced when the above disclosed solid catalyst is subjected to actinic irradiation in the 600 to 7000 A. range. The preferred range is 3800 to 4000 A. The novel catalyst can be conveniently prepared by depositing an alkaline earth metal hydroxide, e.g. $Mg(OH)_2$, $Ba(OH)_2$, $Ca(OH)_2$ and molten zinc or cadmium on alumina particles and calcining the resulting mixture at 500–600° C., or by impregnating alumina particles with, for example, magnesium and zinc compounds which on calcining are converted to their oxides, or by forming a solution or dispersion of compounds of aluminum, zinc and magnesium to precipitating the metals in a form convertible to their oxides and calcining the precipitate or by any other convenient method, where the resulting catalyst is subjected to ultraviolet or actinic irradiation at 600 to 7000 A., preferably 3800 to 4000 A. A convenient ultraviolet irradiation source consists of a mercury vapor arc. The catalyst is irradiated in the presence or absence of the feed hydrocarbon. It can also be irradiated continuously or intermittently. In the preferred operation the catalyst X comprising zinc oxide, magnesium oxide and alumina in the 1:1:3 weight ratio is irradiated intermittently with ultraviolet light at 3900 A. in the presence of the feed hydrocarbons. For optimum results it is essential that the ratio of the alkaline earth metals to the low melting metals of periodic Group II–B having an atomic weight from about 65 to about 113 remain at unity despite the fact that the ratio of alumina varies from 1 to 100 weight parts for each weight part of the alkaline earth oxide or low melting metal oxide. The catalyst is prepared in a granular form suitable in either a fixed bed, moving bed or fluidized bed catalyst system. When the term alumina or the chemical formula "$Al_2O_3$" are used herein in the definition, or description of the catalyst used in this invention, these terms are used to designate activated or catalystic alumina and do not include alpha alumina which does not possess catalytic activity in hydrocarbon conversion processes.

The irradiated dehydrogenation catalyst is ineffective in dehydrogenating alkanes and methyl substituted aromatics such as benzene, toluene, xylene. This resistance to dehydrogenation makes those compounds excellent feed diluents and heat carriers. Benzene, toluene and xylene are particularly useful in keeping down the amount of thermal energy which has to be expended in the endothermic dehydrogenation process. The most useful diluent and heat carrier is benzene because of high heat capacity and thermal stability. Nitrogen and argon have also been found to be effective diluents. It has been discovered that steam, though a common diluent for certain dehydrogenations, when used as a diluent in this process tends to reduce the conversion rate although not affecting the rate of selectivity. To retain the advantages of high selectivity and still obtain high conversion inherent in the irradiated catalyst system, steam should not be used. Steam can, however, be used as a diluent in dehydrogenations where a lower conversion rate can be tolerated while not reducing the high selectivity.

The dehydrogenations can be carried out with the aforementioned combination of oxides of three different metals in a fixed bed of granular catalyst, a moving catalyst bed or a fluidized catalyst bed. By using the fluidized catalyst bed the activated catalyst can be withdrawn and regenerated by oxidizing the carbonaceous deposits causing the deactivation. The regenerated catalyst being hot can serve as a source of heat as the hot regenerated catalyst is recycled to the catalyst conversion zone to supply a portion of the heat necessary in the endothermic process. In a fixed bed operation the feed stock is passed into a preheat zone and heated to the dehydrogenation temperature and then is dehydrogenated in the irradiated catalyst conversion zone.

In the following illustrative example the catalyst, hereinbefore described, is charged as a fixed bed surrounding an ultraviolet irradiating core consisting of a quartz tube-mercury vapor arc. The catalyst is charged in the catalytic conversion zone and the preheat is packed with granular solid particles of refractory catalytic inactive material such as tabular alpha alumina which provides a high heat transfer surface. The hydrocarbon feed is introduced in the preheat zone in an amount admixed with the diluent to provide the unsaturated hydrocarbon feed to catalyst liquid hourly space velocities indicated. In the illustrative examples the exit pressure is 1–2 p.s.i.g. The inlet pressure is higher by the amount necessary to overcome the pressure drop in the conversion zone. The following examples are included as illustrations of the preparation of reaction products of this invention and are not intended as limiting our invention.

*Example 1*

A mixture of nitrogen and cumene in the mole ratio of 9 to 1 is charged into the preheater and heated to about 525–550° and then contacted with a catalyst containing three different metal oxides in the ratio of about 20 weight parts zinc oxide, 20 weight parts magnesium oxide and 60 weight parts alumina where said catalyst is undergoing ultraviolet irradiation at 3800–4000 Angstroms, conveniently supplied from a mercury vapor arc.

The feed stock is introduced to provide a liquid hourly space velocity (LHSV) of 1.25 volumes of cumene per hour per volume of catalyst. By this process there is obtained cumene conversion liquid product distribution containing 68.88% alpha-methylstyrene, 0.40% benzene, 0.32% toluene, 0.62% ethylbenzene, 0.96% styrene, 28.30% cumene and 0.52% other products not identifiable with the foregoing. The selectivity of this process is about 97.2 while the liquid product recovery is 97%. In this process the conversion is approximately 70% when the catalyst is irradiated with the U.V.

*Examples 2 and 3*

Examples 2 and 3 illustrate the effectiveness of the ultraviolet irradiation treatment in changing the catalytic activity of the solid catalyst composition of Example 1. A mixture of nitrogen and cumene in the mole ratio of 9:1 is charged into the preheater and heated to about 525–530° C. and then contacted with a catalyst of Example 1. This catalyst was intermittently irradiated with ultraviolet ligh at 3800–4000 Angstroms. Initially, for the first one and three-quarter hours the catalyst was not irradiated and the conversion rate of cumene to methylstyrene was only 40% but when the catalyst was irradiated in the presence of cumene the conversion rate went up to 70%. This irradiation was continued for fifteen minutes and then ceased. The catalyst composition was permanently modified and the conversion rate continued at about 60–63%. This is much better than 40% conversion rate obtained with the unirradiated catalyst and indicates catalytic activity of a different order of magnitude.

The same procedure as in Example 2 wherein the nitrogen cumene mixture was contacted with an unirradiated catalyst at a temperature of 525–530° C. The conversion rate was 40%. The catalyst was then irradiated continuously at 3800–4000 A. for the rest of the run. The conversion rate of cumene-alpha-methyl-styrene stayed at 55–58%.

These two examples indicate that the optimum conversion rates are obtained when the catalyst is being intermittently irradiated.

*Example 4*

A mixture of nitrogen and 2-methyl-butene-2 in the mole ratio of 9:1 is charged into a preheater and heated to 425–450° C. and is then contacted with a solid catalyst which is undergoing ultraviolet irradiation at 3800–4000 A., conveniently supplied from a mercury vapor arc. The solid catalyst consists of three different metal oxides in the ratio of 20 weight parts zinc oxide, to 20 weight parts magnesium oxide and 60 weight parts alumina. The feed stock is introduced at a rate to provide the 2-methyl-butene-2 liquid hourly space velocity (LHSV) of 2.5 volumes of 2-methyl-butene-2 per hour per volume of catalyst. The feed stock pressure is 125 mm., the total pressure in the tube being 6 p.s.i.g. The conversion rate of 2-methyl-butene-2 to isoprene was 20% at 450° C., 33% at 515° C. and 44% at 600° C. giving a conversion ratio of 2:1 at 450° C., 3:1 at 515° C. and 4:1 at 600° C. over the thermally activated unirradiated catalyst.

*Example 5*

A mixture of nitrogen and 2-methyl-butene-2 in the mole ratio of 9:1 is charged into a preheater and heated to 450° C. and is then contacted with the solid catalyst of Example 2. The rate of conversion of 2-methyl-butene-2 to isoprene is 10%. When the catalyst is irradiated in the 3800–4000 A. range after the process has been 30 minutes on stream the conversion rate doubles and goes up to 20% while the temperature remains at 45° C. This conversion rate is continued until the catalyst loses its special activity after 70 minutes on stream when the conversion rate has dropped to 8%. This rate increased to 11% when the temperature was increased to 515° C. but when the catalyst is subjected to ultraviolet irradiation at this temperature (515° C.) the conversion rate increased to 33% and to 44% when the temperature is increased to 600° C. at 125 minutes on stream. From this we can readily see that the catalyst of Example 2 is vastly more effective when subjected to ultraviolet irradiation.

*Example 6*

A mixture of nitrogen and ethylbenzene in the mole ratio of 9:1 is charged into a preheater and heated to about 600° C. and then contacted with a catalyst containing the three different metal oxides in the ratio of about 20 weight parts zinc oxide, 20 weight parts magnesium oxide and 60 weight parts alumina maintained at about 600° C. and subjected to intermittent ultraviolet irradiation in the 3800–4000 A. range conveniently supplied from a mercury vapor arc. The feed stock is introduced to provide an ethylbenzene to catalyst ratio of five liquid volumes ethylbenzene per volume of catalyst per hour. The exit pressure from the catalyst conversion zone was set so that the ethylbenzene absolute pressure averaged about 0.2 atmosphere in the catalytic conversion zone. The selectivity of conversion of ethylbenzene to styrene is 98% at 70% conversion.

*Example 7*

Benzene can be prepared by contacting the ultraviolet intermittently irradiated solid catalyst containing the three different metal oxides in the ratio of about 20 weight parts zinc oxide, 20 weight parts magnesium oxide and 60 weight parts alumina at a temperature within the range of about 525 to 590° C. with a mixture of benzene and mono n-hexenes (a single mono n-hexene isomer or mixtures of mono n-hexene isomers) at feed rate (LHSV) liquid hourly space velocity ratios of from 2 to 10 liquid volumes of n-hexene feed with concentrations corresponding to a partial pressure of from 0.1 to 0.5 atmosphere at a catalytic conversion zone discharge pressure in the range of from 1 to about 2 atmospheres absolute pressure.

By such a process conversions of the n-hexene feed to benzene on a product basis approaching the thermodynamic heat equilibrium and at selectivities above 90% are obtainable.

Other hydrocarbons containing the mono olefin open chain of six chain carbon atoms either as an open chain hydrocarbon or as a substituted aromatic compound can be used in the process of this invention in place of the specific compounds hereinbefore named since with the foregoing disclosure those skilled in the art can readily visualize the types of hydrocarbons useful in the process of this invention and the products to be obtained therefrom.

What is claimed is:

1. In an improved process for the conversion of unsaturated hydrocarbon feed to more highly unsaturated hydrocarbons by contacting in a catalytic conversion zone said unsaturated hydrocarbon at a temperature above 400° C. with a solid metal oxide catalyst composition consisting of an oxide of one metal of each class of metals consisting of (a) cadmium and zinc, (b) alkaline earth metals and (c) alumina which improvement comprises the actinic irradiation of the solid catalyst within the range of 600–7000 Angstroms prior to using said catalyst in dehydrogenation whereby higher dehydrogenation conversion levels than the unirradiated catalyst are obtained.

2. The method of claim 1 wherein the catalyst is subjected to ultraviolet irradiation prior to using said solid catalyst in a dehydrogenation at 3800–4000 Angstroms.

3. The method of claim 1 wherein the catalyst is irradiated continuously.

4. The method of claim 1 wherein the catalyst is irradiated intermittently.

5. A method of dehydrogenating a mono olefin hydrocarbon feed having only 4 to 5 chain carbon atoms to the corresponding diene hydrocarbon without substantial skeletal rearrangement which comprises contacting in a catalytic conversion zone said mono olefin hydrocarbon at a temperature above 400° C. with a solid metal oxide catalyst composition consisting of an oxide of one metal of each class consisting of (a) cadmium and zinc, (b) alkaline earth metals and (c) alumina, each in the range of from 0.1 to 10 weight parts for each 10 weight parts of alumina wherein the catalyst is subjected to ultraviolet irradiation within the range of 600–4000 Angstroms prior to using said solid catalyst in a dehydrogenation.

6. A method of preparing isoprene which comprises contacting 2-methyl-butene-2 in a catalytic conversion zone maintained at a temperature in the range of 500 to 600° C., having a solid catalyst combination of three different metal oxides in the weight ratio of each 10 parts alumina from 0.1 to 10 parts of zinc oxide and magnesia wherein the catalyst is subjected to ultraviolet irradiation within the range of 600 to 4000 Angstroms, wherein said 2-methyl-butene-2 is contacted at a temperature within the range of 500 to 600° C. with said solid catalyst at the rate to provide for each volume of said solid catalyst from 1 to 20 liquid volumes of said 2-methyl-butene-2 per hour and withdrawing catalytic conversion zone effluent at a pressure of from about two atmospheres to sub-atmospheric pressure.

7. A method of preparing a vinyl substituent aromatic hydrocarbon comprising contacting an aromatic hydrocarbon having at least one alkyl hydrocarbon substituent of only two carbon atoms in its hydrocarbon chain in a catalytic conversion zone at a temperature of above 400° C. with a catalyst composition consisting of an oxide of one metal of each class of metals consisting of (a) cadmium and zinc, (b) alkaline earth metals and (c) alumina in the component weight ratio of for each 10 parts alumina, 0.1 to 10 parts each of said alkaline earth metal oxide and the oxide of said cadmium and zinc wherein said catalyst is subjected to ultraviolet irradiation within the range of 600–4000 Angstroms.

8. A method of preparing styrene comprising contacting ethylbenzene in a catalytic conversion zone at a temperature of above 400° C. with a catalyst having three different metal oxides in the weight ratios for each 10 parts alumina from 0.1 to 10 parts each of zinc oxide and magnesium oxide wherein the solid catalyst is subjected to ultraviolet irradiation at 600–4000 Angstroms.

9. A method of preparing substituted styrene hydrocarbon comprising contacting a benzene having at least one isopropyl hydrocarbon substituent in a catalytic conversion zone at a temperature of about 400° C. with a catalyst having the three different metal oxides in the weight ratio of for each 10 parts alumina from 0.1 to 10 parts each of zinc oxide and magnesium oxide wherein the catalyst is subjected to ultraviolet irradiation of 600–4000 Angstroms.

10. A method for the preparation of 2-methyl-styrene comprising contacting cumene in a catalytic conversion zone at a temperature of about 400° C. with a catalyst having the three different metal oxides in the weight ratio of for each 10 parts of alumina from 0.1 to 10 parts of zinc oxide and magnesium oxide wherein the catalyst is subjected to ultraviolet irradiaton of 600 to 4000 Angstroms.

11. A method of preparing hydrocarbons comprising contacting at the temperature of above 400° C. in a catalytic conversion zone, a hydrocarbon having a mono olefin open chain only from 4 to 6 chain carbon atoms in length and a total of 6–20 carbon atoms with a catalyst subjected to ultraviolet irradiation within the range of 600 to 4000 Angstroms having three different metal oxides of which one is alumina and the other two are one each of alkaline earth metal oxide and oxide of zinc or cadmium whereat said mono olefin hydrocarbon chain undergoes dehydrogenation and cyclization.

12. A method of preparing benzene comprising contacting (a) n-hexene at a temperature above 400° C. in a catalytic conversion zone with a catalyst subjected to ultraviolet irradiation of 600 to 4000 Angstroms having the three different metal oxides in the weight ratio indicated in the range of from 0.1 to 5 parts each of zinc oxide and magnesium oxide for each 10 parts of alumina whereat said n-hexene is dehydrogenated and cyclized to benzene.

References Cited

UNITED STATES PATENTS

| | | | |
|---|---|---|---|
| 2,110,833 | 3/1938 | Mark et al. | 252—463 |
| 2,354,892 | 8/1944 | Thacker | 260—683.3 |
| 3,278,453 | 10/1966 | Wennerberg | 252—463 |

JOHN H. MACK, *Primary Examiner.*

HOWARD S. WILLIAMS, *Examiner.*

UNITED STATES PATENT OFFICE

CERTIFICATE OF CORRECTION

Patent No. 3,360,449            December 26, 1967

Arnold N. Wennerberg

It is hereby certified that error appears in the above numbered patent requiring correction and that the said Letters Patent should read as corrected below.

Column 2, line 56, for "catalystic" read -- catalytic --; column 3, line 68, for "ligh" read -- light --; column 4, line 42, for "45° C." read -- 450° C. --; column 5, line 36, after "than" insert -- with --; column 6, line 41, after "preparing" insert -- aromatic --.

Signed and sealed this 21st day of January 1969.

(SEAL)
Attest:

Edward M. Fletcher, Jr.            EDWARD J. BRENNER
Attesting Officer                Commissioner of Patents